(12) United States Patent
Jeon et al.

(10) Patent No.: US 11,108,260 B2
(45) Date of Patent: Aug. 31, 2021

(54) DEVICE AND METHOD FOR PERFORMING WIRELESS CHARGING AND PAYMENT

(71) Applicant: Samsung Electronics Co., Ltd., Gyeonggi-do (KR)

(72) Inventors: Jae Woong Jeon, Gyeonggi-do (KR); Kyeong Jo Keum, Gyeonggi-do (KR); Jung Sik Park, Gyeonggi-do (KR)

(73) Assignee: Samsung Electronics Co., Ltd ( * ) Notice: Subject to any disclaimer, the term of this patent is extended or adjusted under 35 U.S.C. 154(b) by 179 days.

(21) Appl. No.: 16/491,628

(22) PCT Filed: Mar. 7, 2018

(86) PCT No.: PCT/KR2018/002711
§ 371 (c)(1),
(2) Date: Sep. 6, 2019

(87) PCT Pub. No.: WO2018/164482
PCT Pub. Date: Sep. 13, 2018

(65) Prior Publication Data
US 2020/0036213 A1 Jan. 30, 2020

(30) Foreign Application Priority Data
Mar. 8, 2017 (KR) .................. 10-2017-0029640

(51) Int. Cl.
*H01M 10/44* (2006.01)
*H01M 10/46* (2006.01)
(Continued)

(52) U.S. Cl.
CPC .......... *H02J 7/025* (2013.01); *G06Q 20/3278* (2013.01); *H02J 7/027* (2013.01);
(Continued)

(58) Field of Classification Search
CPC ........ H02J 7/00045; H02J 50/10; H02J 50/80; H04B 5/0087; H04B 5/0031; H04B 5/0037; G06Q 20/3278; Y04S 50/12
(Continued)

(56) References Cited

U.S. PATENT DOCUMENTS 9,888,442 B2 2/2018 Tsukamoto
9,935,456 B2 4/2018 Mori et al.
(Continued)

FOREIGN PATENT DOCUMENTS

KR 20160041473 4/2016
KR 20160090236 7/2016
(Continued)

OTHER PUBLICATIONS

PCT/ISA/210 Search Report Issued on PCT/KR2018/002711, pp. 5.
PCT/ISA/237 Written Opinion issued on PCT/KR2018/003595, pp. 5.

*Primary Examiner* — Edward Tso
(74) *Attorney, Agent, or Firm* — The Farrell Law Firm, P.C.

(57) ABSTRACT

Disclosed is an electronic device. The electronic device according to an embodiment disclosed in the disclosure may include housing, a battery, a first coil receiving power transmitted wirelessly from a power transmitting unit physically coupled with an electronic device through the housing, a wireless charging circuit electrically connected to the first coil and transmitting the received power to the battery, a communication circuit generating a payment signal, using a second coil distinguished from the first coil; and a processor electrically connected to the wireless charging circuit and the communication circuit. The processor may be configured to identify an event associated with the payment signal and to transmit a first message, which is set such that the power transmitting unit adjusts transmission of power, to the power (Continued)

transmitting unit through the first coil based on the event. Moreover, various embodiment grasped through the disclosure are possible.

15 Claims, 9 Drawing Sheets

(51) Int. Cl.
  *H02J 7/02* (2016.01)
  *H02J 50/80* (2016.01)
  *H02J 50/10* (2016.01)
  *G06Q 20/32* (2012.01)
  *H02J 7/00* (2006.01)
(52) U.S. Cl.
  CPC .............. *H02J 50/10* (2016.02); *H02J 50/80* (2016.02); *H02J 7/00045* (2020.01)
(58) Field of Classification Search
  USPC .......................... 320/107, 108, 135; 307/104
  See application file for complete search history.

(56) References Cited

U.S. PATENT DOCUMENTS

| | | | |
|---|---|---|---|
| 2013/0140906 A1* | 6/2013 | Tanabe | H02J 7/025 307/104 |
| 2015/0358908 A1 | 12/2015 | Tsukamoto | |
| 2016/0020600 A1 | 1/2016 | Mori et al. | |
| 2016/0072298 A1* | 3/2016 | Fine | H02J 50/12 307/104 |
| 2016/0210615 A1 | 7/2016 | Lee et al. | |
| 2016/0308587 A1 | 10/2016 | Lee et al. | |
| 2016/0345125 A1 | 11/2016 | Kim et al. | |

FOREIGN PATENT DOCUMENTS

| | | |
|---|---|---|
| KR | 20160136806 | 11/2016 |
| WO | WO2014156570 | 10/2014 |

\* cited by examiner

DEVICE AND METHOD FOR PERFORMING WIRELESS CHARGING AND PAYMENT

PRIORITY

This application is a National Phase Entry of PCT International Application No. PCT/KR2018/002711 which was filed on Mar. 7, 2018, and claims priority to Korean Patent Application No. 10-2017-0029640, which was filed on Mar. 8, 2017, the content of each of which is incorporated herein by reference.

TECHNICAL FIELD

The disclosure relates to a wireless charging technology and a mobile payment technology.

BACKGROUND ART

The wireless charging technology using an electromagnetic induction method or a resonance method has been recently distributed using a mobile electronic device such as a smartphone. For example, when a power transmitting unit (PTU) such as a wireless charging pad and a power receiving unit (PRU) such as a smartphone approach each other within a predetermined distance, the battery of the PRU may be charged by electromagnetic induction or resonance between the transmission coil of the PTU and the reception coil of the PRU.

For the purpose of improving mobility and portability, products designed such that the PTU is physically coupled with mobile electronic devices are emerging. For example, the PTU such as a battery pack may be coupled with the rear cover of a smartphone and then may supply power to the coupled smartphone wirelessly. Even in a state where a user holds a mobile electronic device, the PTU may perform wireless charging, thereby improving the convenience of the user.

In the meantime, an electronic device such as a smartphone may provide a short range wireless payment function through short range wireless communication (e.g., near field communication (NFC) or magnetic secure transmission (MST)). For example, when the electronic device makes a payment using NFC or MST, the electronic device may generate a payment signal in a proper frequency band, using the coil for NFC or MST mounted inside the electronic device. Accordingly, the electronic device may include different coils for NFC, MST, and wireless power charging (WPC).

DISCLOSURE

Technical Problem

When a payment is made while power is supplied from a PTU, current may flow into an NFC coil or an MST coil. This may affect other wireless charging coils (e.g., the wireless charging coil of the PRU and/or the PTU). Moreover, the current, which is supplying or receiving power and which flows into the wireless charging coil, may also affect the NFC coil or MST coil. As a result, the coil of the PTU or PRU may be damaged due to overcurrent, or the like.

Furthermore, In the case of the wireless charging in the in-band communication scheme using the same frequency as the power signal of the wireless charging to exchange the control message associated with wireless charging, unlike the wireless charging in the out-band communication scheme in which a separate channel for transmitting the control message is present, unless the command is defined in the standard, the terminal may not intervene in the wireless charging.

To provide an electronic device for solving the above-described problem and problems brought up in this specification.

Technical Solution

According to an embodiment disclosed in the disclosure, an electronic device may include housing, a battery, a first coil receiving power transmitted wirelessly from a power transmitting unit physically coupled with an electronic device through the housing, a wireless charging circuit electrically connected to the first coil and transmitting the received power to the battery, a communication circuit generating a payment signal, using a second coil distinguished from the first coil; and a processor electrically connected to the wireless charging circuit and the communication circuit. The processor may be configured to identify an event associated with the payment signal and to transmit a first message, which is set such that the power transmitting unit adjusts transmission of power, to the power transmitting unit through the first coil based on the event.

According to another embodiment disclosed in the disclosure, a method performed by an electronic device may include wirelessly receiving power from a power transmitting unit physically coupled with the electronic device through a first coil, while wirelessly receiving the power, identifying an event associated with a payment signal, transmitting a first message, which is set such that the power transmitting unit adjusts transmission of power, to the power transmitting unit through the first coil based on the event, and when the power transmission is interrupted from the power transmitting unit, generating the payment signal through a second coil.

According to still another embodiment disclosed in the disclosure, an electronic device may include a power generating circuit generating power to be transmitted to a power receiving unit physically coupled with the electronic device and a coil electrically connected to the power generating circuit and transmitting the generated power to the power receiving unit. The electronic device may adjust transmission the power in response to receiving of the first message when receiving a first message from the power receiving unit through the coil.

Advantageous Effects

According to embodiments disclosed in the disclosure, an electronic device may continuously perform a charging function and a payment function, without the damage of a wireless charging circuit and a communication circuit.

Besides, a variety of effects directly or indirectly understood through the disclosure may be provided.

MODE FOR INVENTION

Figure 1:
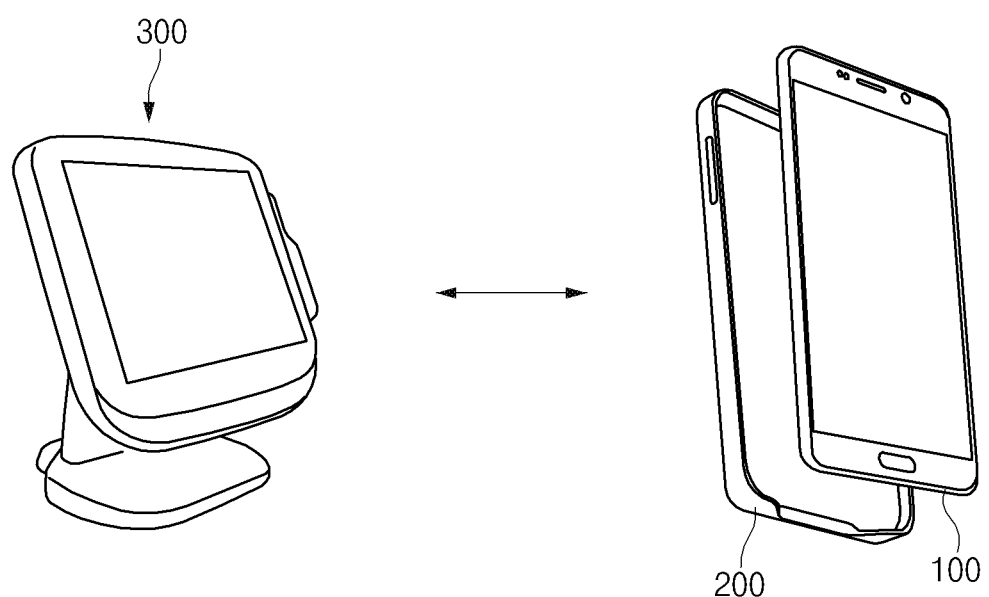
FIG. 1 illustrates an environment in which a payment is made during wireless charging, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates an environment in which a payment is made during wireless charging, according to an embodiment.

Referring to FIG. 1, an electronic device 100 may receive power from a PTU 200. Furthermore, the electronic device 100 may transmit or receive data by wirelessly interacting with an external payment device 300. The electronic device 100 may charge a battery, using the power received from the PTU 200 and may communicate with the payment device 300 to make a payment.

In an embodiment, for example, the electronic device 100 may be a smartphone supporting wireless charging. However, embodiments are not limited thereto. The electronic device 100 may include a portable user terminal in which the wireless charging is possible.

In an embodiment, the PTU 200 may wirelessly supply power to the electronic device 100. Moreover, the PTU 200 may be attached to or coupled with the electronic device 100.

In an embodiment, the PTU 200 may be coupled with the electronic device 100 and may perform the wireless charging in the coupled state. For example, the PTU 200 may be physically coupled with the electronic device 100 through the housing of the electronic device 100. For example, the PTU 200 may be detached/attached from/to the outside of the electronic device 100 by the mechanical structure thereof. According to an embodiment of the disclosure, the PTU 200 may be detached/attached from/to the electronic device 100 by the magnet included in the PTU 200.

For example, the electronic device 100 may be a smartphone that supports short range wireless communication. The electronic device 100 may make a payment with the payment device 300 via the short range wireless communication. For example, the short range wireless communication scheme may be an MST scheme or an NFC scheme.

For example, the payment device 300 may correspond to a POS terminal or an NFC terminal. In an embodiment, when the payment request of a user is present, the electronic device 100 may communicate with the payment device 300 to make a payment corresponding to the payment request. In another embodiment, the electronic device 100 may make a payment corresponding to the payment request received from the payment device 300.

According to an embodiment, when the payment request of the user is present while the electronic device 100 performs wireless charging using the PTU 200, the electronic device 100 may temporarily interrupt the wireless charging and may communicate with the payment device 300 to make a payment. After the payment is made, the electronic device 100 may resume the wireless charging using the PTU 200.

Figure 2:
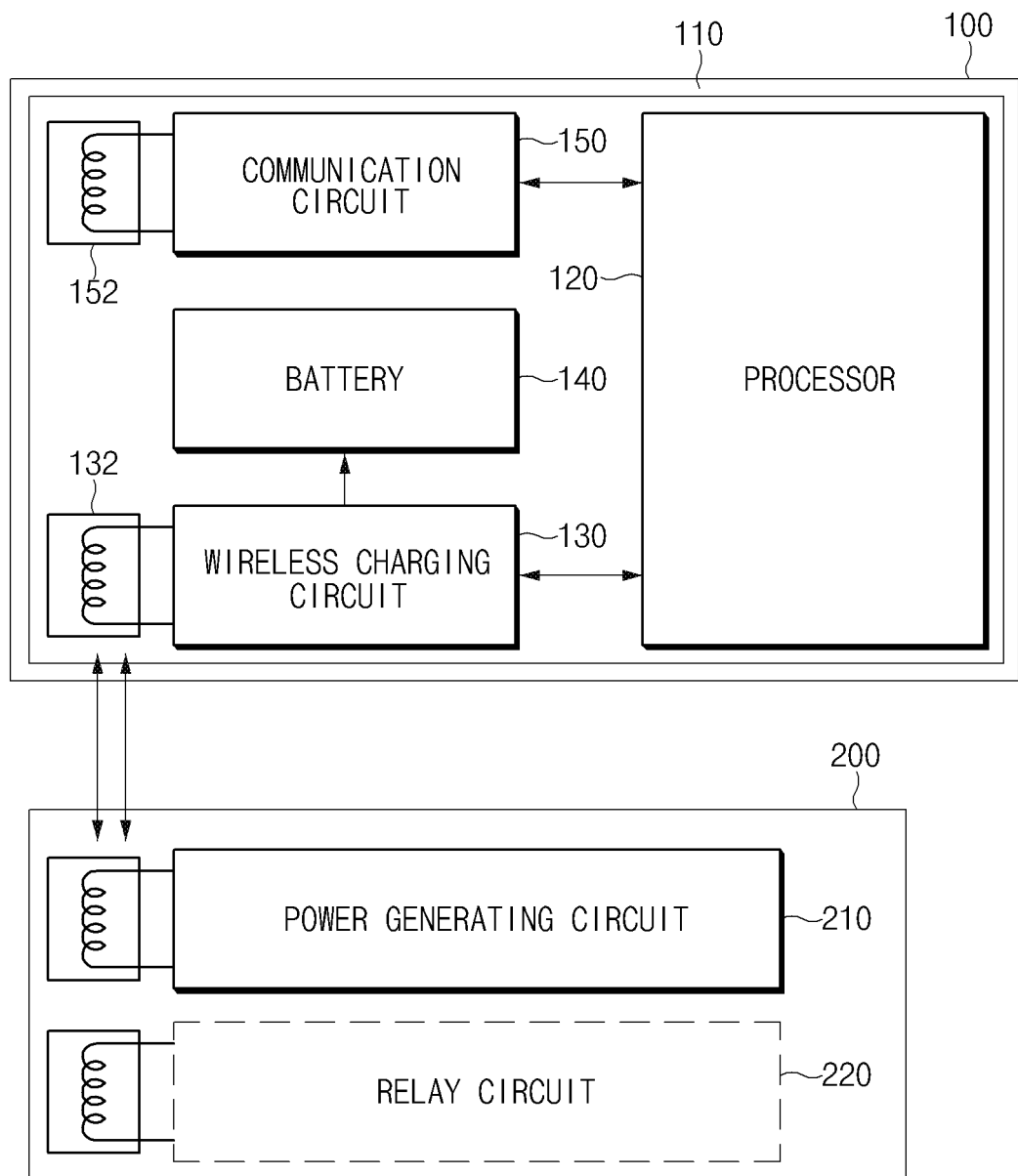
FIG. 2 is a block diagram illustrating the configurations of an electronic device and a PTU, according to an embodiment.

FIG. 2 is a block diagram illustrating the configurations of an electronic device and a PTU, according to an embodiment.

Referring to FIG. 2, the electronic device 100 may be referred to a "PRU". For example, the electronic device 100 may include housing 110, a processor 120, a wireless charging circuit 130, a first coil 132, a battery 140, a communication circuit 150, and a second coil 152.

It may be understood that the housing 110 of the electronic device 100 is a frame surrounding the electronic device 100. In an embodiment, the PTU 200 may be physically coupled with the electronic device 100 through the housing 110 of the electronic device 100. In an embodiment, the processor 120, the wireless charging circuit 130, the first coil 132, the battery 140, the communication circuit 150, and the second coil 152 may be disposed in the housing 100.

The processor 120 may be electrically connected to the wireless charging circuit 130 and the communication circuit 150 so as to transmit or receive a signal to and from each other.

The wireless charging circuit 130 may be electrically connected to the first coil 132; the first coil 132 may receive power wirelessly supplied from the PTU 200. In this respect, the first coil 132 may be referred to as a power receiving coil. The wireless charging circuit 130 may supply power received via the first coil 132 to the battery 140 and may allow the wireless charging to be performed.

The communication circuit 150 may generate a payment signal for making a payment with the external payment device 300, using the second coil 152.

In an embodiment, the communication circuit 150 may generate the payment signal for a payment request, based on the MST scheme or the NFC scheme. In this respect, the second coil 152 may be referred to as an MST coil or an NFC coil. The generated payment signal may include information associated with the payment. The generated payment signal may be transmitted to the payment device 300; the payment device 300 may perform the payment process using the received payment signal.

In an embodiment, when an event associated with a payment signal occurs, the communication circuit 150 may generate the payment signal.

For example, the event may indicate that a specific application is running or a user authentication occurs. However, an embodiment is not limited thereto, and an event for starting to make a payment may be included.

For example, the event may indicate that a payment request is received from the outside. The payment signal may be generated depending on the payment request of an external electronic device (e.g., a POS terminal, a smartphone, or a server) or the like. When the electronic device determines that the payment request has been received from the external electronic device, the electronic device may generate the payment signal.

For example, the PTU 200 may include a power generating circuit 210 and a coil electrically connected to the power generating circuit. This coil may be referred to as a power transmitting coil. Also, the PTU 200 may additionally include the relay circuit 220 and a coil connected to the relay circuit 220.

The power generating circuit 210 of the PTU 200 may generate power to be transmitted to the electronic device 100, using power previously received from the outside by the PTU 200 or power stored in advance in the PTU 200.

The relay circuit 200 may perform a function of relaying the payment signal generated by the second coil 152 of the electronic device 100, or the like to an external device. The relay circuit 220 may compensate for the air loss of a signal, which has a problem generated by physically connecting the PTU 200 to the electronic device 100.

Hereinafter, a method of performing a payment function during wireless charging will be described with reference to FIGS. 3 and 4. The operations illustrated in FIGS. 3 and 4 may be performed by the electronic device 100 illustrated in FIG. 2. For example, the operations may be implemented with instructions capable of being performed (or executed) by the processor 120 of the electronic device 100. The instructions may be stored in, for example, a computer-readable recording medium or the electronic device 100 illustrated in FIG. 2. The description in FIGS. 3 and 4 will be given using the reference numerals of FIG. 2.

Figure 3:
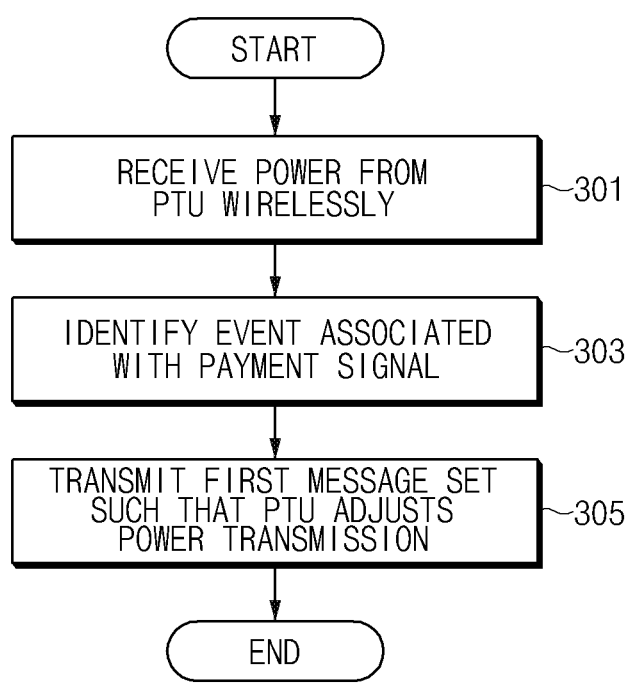
FIG. 3 illustrates a wireless charging control process of an electronic device when a payment function is performed during wireless charging, according to an embodiment.

FIG. 3 illustrates a wireless charging control process of an electronic device when a payment function is performed during wireless charging, according to an embodiment. Referring to FIG. 3, the method according to an embodiment may include operation 301 to operation 305.

In operation 301, the processor 120 of the electronic device 100 may wirelessly receive power via the first coil 132 from the PTU 200 physically coupled with the electronic device 100.

In operation 303, the processor 120 of the electronic device 100 may identify the event associated with a payment signal while receiving the power wirelessly. The event associated with the payment signal may mean an event for starting to make a payment.

In an embodiment, when an application associated with the payment signal is executed, when the authentication of a user associated with the payment signal occurs, or when the payment request is received from an external device, the processor 120 of the electronic device 100 may transmit a first message to the PTU 200.

In an embodiment, the processor 120 of the electronic device 100 may perform the authentication based on at least one of a fingerprint, an iris, facial recognition, and a password.

In operation 305, the processor 120 of the electronic device 100 may transmit a first message, which is set such that the PTU 200 adjusts the transmission of power, to the PTU 200 via the first coil 132 based on the event.

In an embodiment, it may be understood that the first message is a message transmitted by the electronic device 100 to control the PTU 200. The electronic device 100 may transmit a control command to the PTU 200 via a coil. Accordingly, the first message may be the control command, which is defined in a standard, for controlling the PTU 200 in an in-band communication environment.

When a payment request of the user occurs during wireless charging, the electronic device 100 may transmit the first message to the PTU 200 to interrupt wireless charging.

In an embodiment, when the PTU 200 receives the first message, the PTU 200 may temporarily interrupt the power supply by interrupting the current induced in the power transmitting coil during a time specified in the first message or during a predetermined time. In this way, it is possible to prevent coil damage caused by perform simultaneously payment and charging. In addition, when the specified time has elapsed, the PTU 200 may determine that the payment process is completed or terminated and may automatically resume the wireless charging.

In an embodiment, when receiving the first message, the PTU 200 may interrupt power transmission to the electronic device 100. Afterward, when the electronic device 100 transmits another control message for recharging to the PTU 200 after the payment is completed, the power transmission may be restarted.

Figure 4:
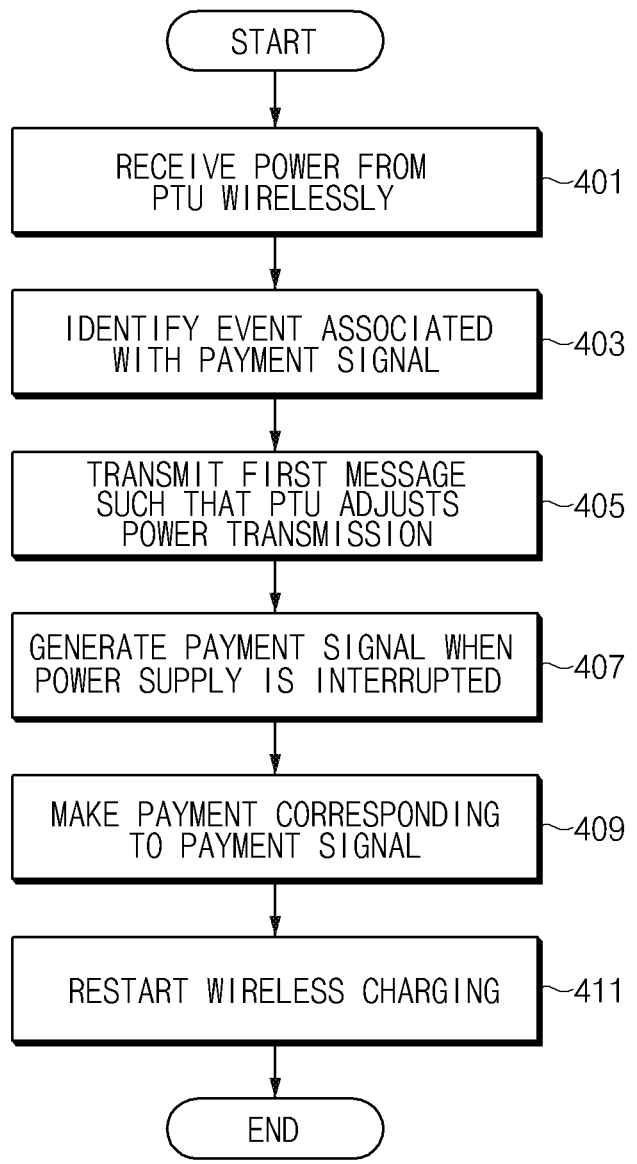
FIG. 4 illustrates a wireless charging control process of an electronic device when a payment function is performed during wireless charging, according to an embodiment.

FIG. 4 illustrates a wireless charging control process of an electronic device when a payment function is performed during wireless charging, according to an embodiment.

In FIG. 4, the method according to an embodiment may include operation 401 to operation 411. Operations 401 to operations 405 correspond to operations 301 to operations 305 of FIG. 3, and thus a detailed description thereof is omitted.

In operation 407, the communication circuit 150 of the electronic device 100 may generate a payment signal via the second coil 152 when power transmission from the PTU 200 is interrupted.

When the electronic device 100 performs wireless charging through the PTU 200, the current flows into the wireless charging coil; when the electronic device 100 makes a payment, the current flows into a payment coil such as an MST coil, an NFC coil, or the like. Accordingly, when the payment is made during wireless charging, the current simultaneously flows into the wireless charging coil and the payment coil; both the wireless charging coil and the payment coil in the electronic device 100 may be damaged due to overcurrent, or the like. Accordingly, the damage of the first coil 132 and the coil of the PTU 200 may be prevented by simultaneously performing the payment and the charging.

In an embodiment, the electronic device 100 may determine that power transmission from the PTU 200 is interrupted and then may allow the payment signal to be generated. In another embodiment, while the electronic device 100 expects that the power transmission is interrupted after the first message is transmitted, the electronic device 100 may generate a payment signal.

In an embodiment, the payment signal may be generated based on an MST scheme, an NFC scheme, or a Bluetooth low energy (BLE) scheme.

In operation 409, the processor 120 of the electronic device 100 may make a payment corresponding to the payment signal. For example, the electronic device 100 may communicate with an external payment terminal or an external server to perform a payment process.

In operation 411, the processor 120 of the electronic device 100 may restart wireless charging. In an embodiment, after the wireless charging is interrupted, when the payment is completed or the sufficient time required to make a payment has elapsed, the processor 120 of the electronic device 100 may restart the wireless charging. The electronic device 100 may allow the charging to be restarted after a payment is made, and thus the charging function and the payment function may be performed continuously.

In an embodiment, the first message may be transmitted to the PTU 200 such that the transmission of power is interrupted during a predetermined time. It may be understood that the predetermined time is the time required to make a payment.

In various embodiments, the appropriate time may be designated in advance depending on the payment method or a type of the electronic device 100. For example, when the electronic device 100 supports the payment in the MST scheme (e.g., executing an application making a payment in the MST scheme), the power transmission of the PTU 200 may be interrupted by the first message for about 20 seconds. For another example, when the electronic device 100 supports the payment in the NFC scheme (e.g., executing an application making a payment in the NFC scheme), the first message may interrupt the power transmission of the PTU 200 for about 2 seconds. When the electronic device 100 supports a plurality of different wireless payment schemes (e.g., the executed payment application makes a payment in the plurality of different wireless payment schemes), the power transmission of the PTU 200 may be interrupted by the first message during the time corresponding to the payment method, which has the longest payment time, from among the available payment methods.

In an embodiment, when a predetermined time elapses, the processor 120 of the electronic device 100 may receive power from the PTU 200 via the first coil 132.

Figure 5:
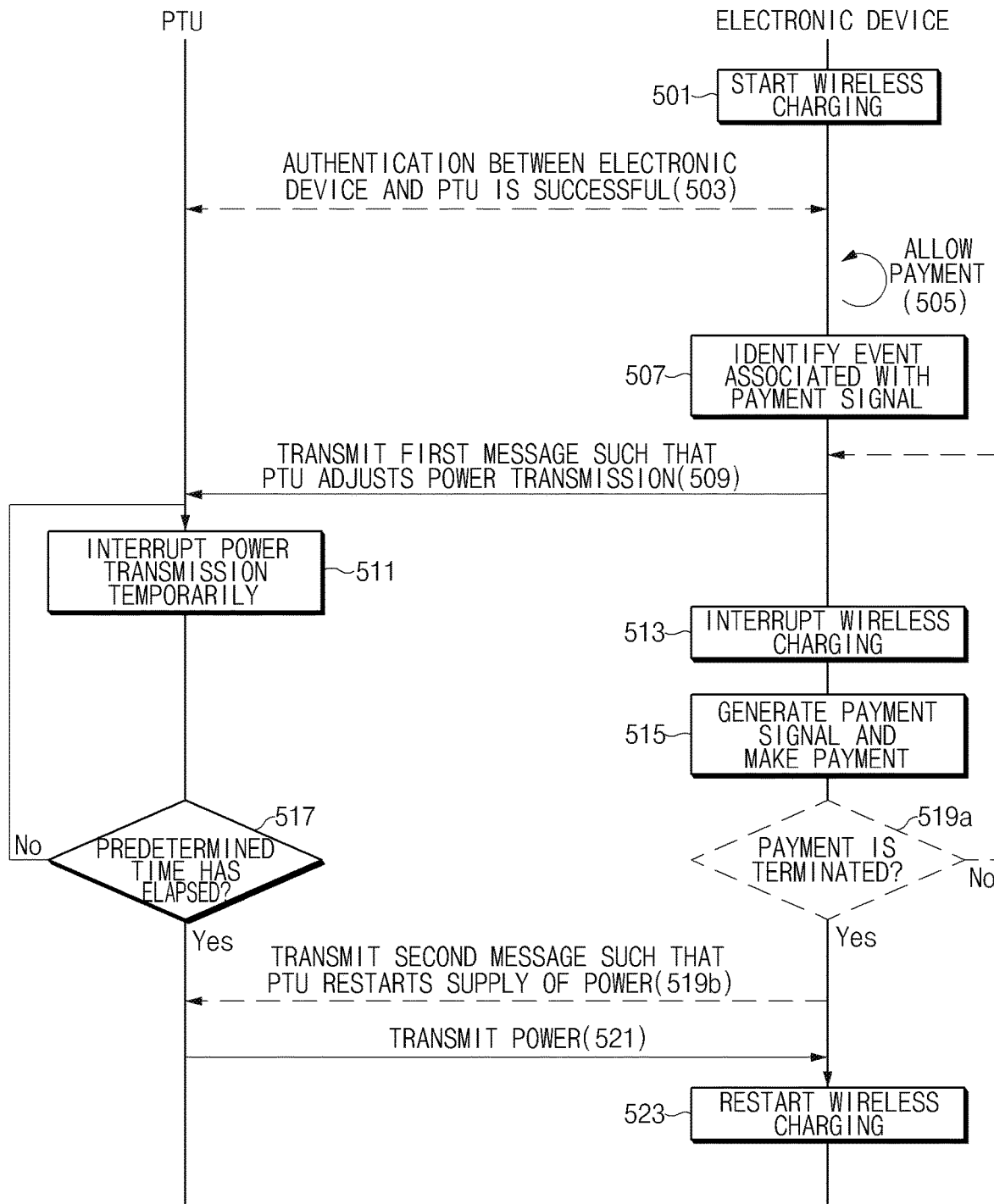
FIG. 5 illustrates a flowchart of an operation performed between an electronic device and a PTU, according to an embodiment.

FIG. 5 illustrates a flowchart of a wireless charging operation and a payment operation performed between an electronic device and a PTU, according to an embodiment.

Referring to FIG. 5, the method according to an embodiment may include operation 501 to operation 523. Operation 501 to operation 523 may be performed by the interaction between an electronic device (e.g., the electronic device 100 of FIG. 2) and a PTU (e.g., the PTU 200 of FIG. 2).

In operation 501, the processor (e.g., the processor 120 of FIG. 2) of an electronic device may start wireless charging using the power received from the PTU. When wireless charging is started, in operation 503, the processor of the electronic device (e.g., the processor 120 of FIG. 2) may perform authentication on the PTU and may control a communication circuit (e.g., the communication circuit 150 of FIG. 2) depending on whether the authentication is successful.

In an embodiment, the processor of the electronic device may determine whether the PTU is a PTU (e.g., a genuine PTU) capable of interrupting wireless charging by the first message, by authenticating the electronic transmitting device.

In an embodiment, only when the PTU is a device supporting the control command corresponding to the first message, the electronic device may interrupt the wireless charging. The electronic device may determine whether the PTU is the device supporting the control command corresponding to the first message, through the authentication process. The electronic device may determine whether to allow a payment, based on the authentication result.

While the power is received from the PTU when the authentication is successful, in operation 505, the processor of the electronic device may allow the communication circuit to generate the payment signal.

In another embodiment, when authentication fails, while the power is received from the PTU, the processor of the electronic device may restrict the communication circuit from generating the payment signal. The payment function may not be performed during wireless charging, and thus it is possible to prevent a coil from being damaged.

In another embodiment, when the authentication fails, the processor of the electronic device may display a screen for providing a notification that the payment is not possible, on the display of the electronic device in response to the occurrence of the detected event.

The authentication procedure of operation 503 and operation 505 may be omitted depending on the types or settings of the electronic device and the PTU.

In operation 507, the processor of the electronic device may identify the event associated with the payment signal, when there is a payment request of the user or when a payment request is received from an external device. It may be understood that the event is an event for starting to make a payment.

In operation 509, the processor of the electronic device may transmit the first message, which is set such that the PTU adjusts power transmission, to the PTU.

In an embodiment, it may be understood that the first message is a command for interrupting the power supply of the PTU. For example, for the purpose of interrupting the charging, the electronic device may select one of the reasons predefined in 'End Power Transfer Packet (0x02)', using the first message to transmit the selected one to the PTU.

In still another embodiment, it is possible to add a new reason to 'End Power Transfer Packet (0x02)' to temporarily interrupt the power supply during a specified time. It is possible to select one of the reserved values of 'End Power Transfer Packet (0x02)' and to newly add a 'hold command' for temporarily interrupting the charging. In this case, the first message may mean the hold command.

For example, the PTU that receives the hold command may interrupt the transmission of power during a predetermined time; when the specified time has elapsed, the PTU may restart the transmission of power.

In operation 511, the PTU may temporarily interrupt power transmission, in response to the reception of the first message. For example, when receiving the hold command, the PTU may restart the power transmission after the PTU interrupts the power transmission during a specific time.

In an embodiment, when the PTU receives the hold command, the PTU may interrupt the power transmission in a standby state where a power signal is not removed.

When the power transmission of the PTU is interrupted in operation 511, the wireless charging of the electronic device may be interrupted in operation 513. When the wireless charging is interrupted, in operation 515, the electronic device may generate a payment signal and make a payment corresponding to the payment signal. When the wireless charging is interrupted temporarily, the electronic device may allow the payment to be made, thereby preventing the risk of circuit damage.

In operation 517, the PTU may determine whether a predetermined time has elapsed, depending on the hold command. It may be understood that the predetermined time is the time required to make a payment. When the hold command is added, the appropriate time required to make a payment may be designated in advance. In various embodiments, the appropriate time may be designated in advance depending on a payment method or a type of the electronic device.

In an embodiment, the PTU may determine whether a predetermined time has elapsed, based on a point in time when the first message is received or a point in time when the power transmission is interrupted temporarily. For example, the PTU may count the predetermined time through a known module including a timer function, such as a Real Time Clock (RTC), a separate timer, or the like. Also, the PTU may be in a power transmission standby state during a predetermined time.

In operation 521, the PTU may transmit power to an electronic device again, when a predetermined time has elapsed.

The PTU may transmit power to the electronic device in the power transfer phase. In an embodiment, the PTU may maintain the power transfer phase even though power transmission is interrupted temporarily. Because the power transfer phase may correspond to a state where the identification between the electronic device and the PTU is already made through a ping phase and an identification & configuration phase, the PTU may skip the ping phase and the identification & configuration phase and may immediately start power transmission when resuming the charging. Accordingly, the separate identification/configuration procedure is not required for the charging, and thus the charging may be restarted quickly. In an environment where the payment and the charging need to be performed seamlessly, both the charge interruption and restart processes may be performed in the power transfer phase, the wireless charging may be restarted quickly after the payment is completed.

In addition, in another embodiment, it is possible to restart from the ping phase when the recharging is performed.

In operation 519a, the processor of the electronic device may determine whether the payment is completed. When the payment is not completed or when there is a retry request for payment, the electronic device may perform operation 509 again and then may allow the wireless charging to be interrupted. Even when the payment is made beyond the specific time, the wireless charging may be interrupted while the payment is being made.

In an embodiment, operation 517 and operation 519a may alternatively be performed to determine whether the wireless charging is capable of being restarted. The PTU may determine whether a sufficient time required to make a payment has elapsed; the electronic device may determine whether the payment is completed and may allow the wireless charging to be restarted. Because the wireless charging is restarted before the payment is completed, circuit damage may be prevented. In the former case, operation 517 and operation 521 may be performed; and in the latter case, operation 519a, operation 519b, and operation 521 may be performed.

When the electronic device may determine that the payment is terminated (e.g., completed or canceled) in operation 519a, in operation 519b, the electronic device may transmit a second message to the PTU such that the PTU restarts the supply of power.

Operation 509b and operation 517 may be performed alternatively. Accordingly, when the predetermined time has elapsed, the PTU may actively restart power transmission (in operation 517); when the second message is received, the PTU may manually restart the power transmission (in operation 519b).

In an embodiment, it may be understood that the second message is a command for allowing the PTU to start power supply. For example, for the purpose of restarting wireless charging, the electronic device may select one of reserved values of End Power Transfer Packet (0x02) to newly add a 'restart command' for restarting the charging. In this case, the second message may mean the restart command.

For example, the PTU that has received the restart command may restart transmission of the power that has been interrupted; the electronic device may restart power reception. After the electronic device identifies that the payment is completed, the electronic device transmits the restart command, thereby preventing the payment and the charging from being performed simultaneously.

In another embodiment, the event associated with the payment signal may reoccur before the predetermined time has elapsed in operation 517. For example, when a user makes a payment again after canceling the payment, because another payment procedure is newly started before one payment procedure is completed, the payment time may become longer. At this time, even though the charging has already been interrupted, the electronic device may again perform operation 507 and operation 509 in response to the reoccurring event. The electronic device may extend the charging interruption time by transmitting the first message to the PTU again.

When the PTU restarts power transmission to the electronic device in operation 521, in operation 523, the electronic device may receive the power and restart the wireless charging. Through the series of processes illustrated in FIG. 5, the user may employ the wireless charging function and the payment function of the electronic device continuously and seamlessly.

Figure 6:
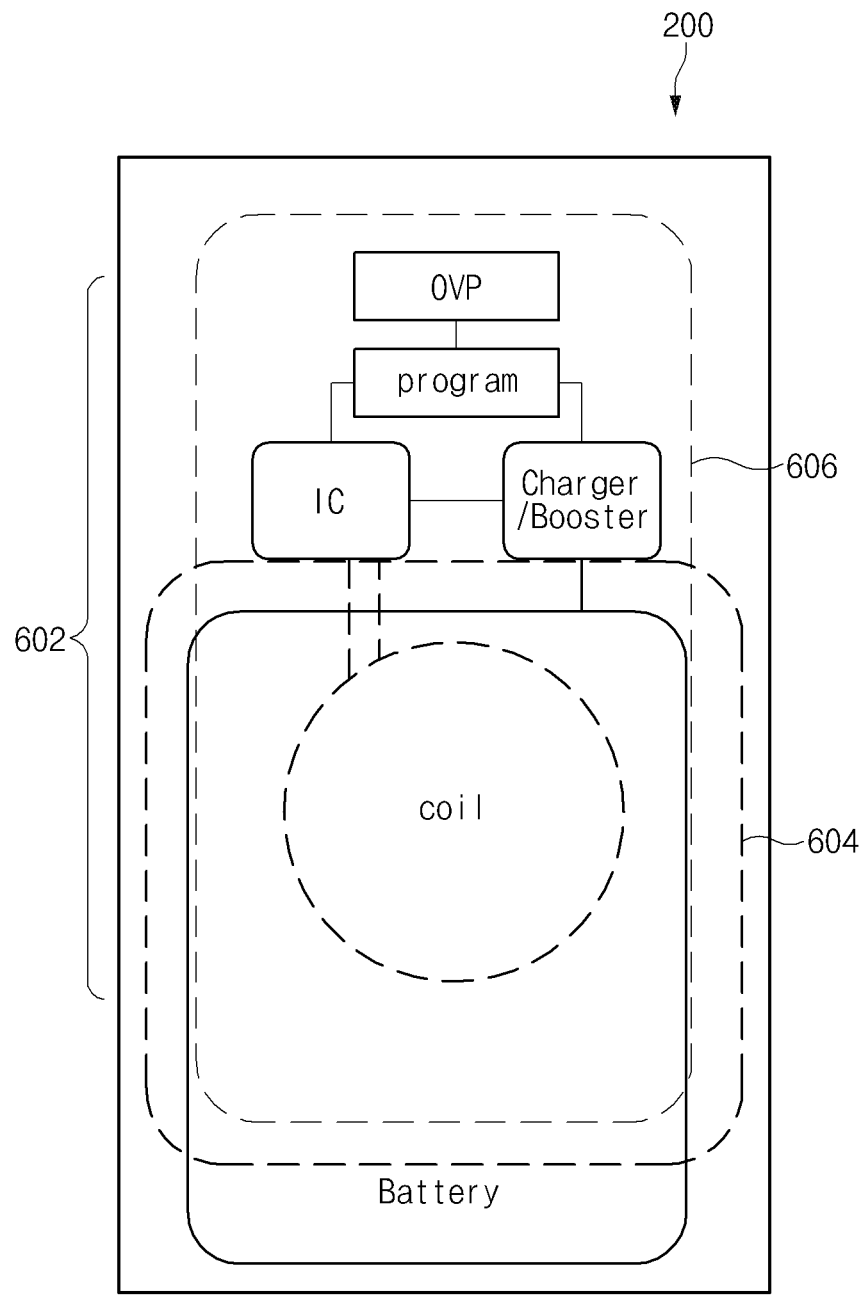
FIG. 6 is a view illustrating a structure of a PTU, according to an embodiment of the disclosure.

FIG. 6 is a view illustrating a structure of a PTU, according to an embodiment of the disclosure.

Referring to FIG. 6, a PTU (e.g., the PTU 200 of FIG. 2) may include a power generating circuit 602 (e.g., the power generating circuit 210 of FIG. 2), a battery, relay circuits 604 and 606 (e.g., the relay circuit 220 of FIG. 2).

The power generating circuit 602 may generate the power to be transmitted to an electronic device such as that illustrated in FIG. 1, using the power stored in the battery. The electronic device may be referred to as a "PRU". In an example, the PTU is physically coupled with the electronic device and may perform wireless charging even when the electronic device is moving.

The power generating circuit 602 may include a coil, an integrated circuit (IC), and an over voltage protection (OVP) circuit. The coil, the IC, and the OVP circuit may be controlled by a control program.

The PTU illustrated in FIG. 6 may be referred to as the PTU 200 of FIG. 2. The description associated with the power generating circuit 210 of FIG. 2 may also be applied to the power generating circuit 602 of FIG. 6. Furthermore, the description associated with the coil connected to the power generating circuit 210 of FIG. 2 may also be applied to the coil of FIG. 6.

The relay circuits 604 and 606 may preserve the air loss of a signal generated when the payment signal is transmitted from the electronic device to an external device. The relay circuits 604 and 606 may be referred to as the relay circuit 220 of FIG. 2 and a coil connected to the relay circuit 220.

It may be understood that the relay circuit 604 or 606 is a coupler coil. In an embodiment, the coupler coil may include an MST coupler coil and an NFC coupler coil. For example, the relay circuit 604 may be the MST coupler coil; the relay circuit 606 may be the NFC coupler coil. The MST coupler coil may operate when the payment is made in the MST payment scheme; the NFC coupler coil may operate when the payment is made in the NFC payment scheme.

In an embodiment, the MST coupler coil may transmit or receive frequencies in the KHz band; the NFC coupler coil may transmit or receive frequencies in 13.56 MHz band.

In another embodiment, the NFC coupler coil may operate when authentication between the electronic device and the PTU is performed. For example, the electronic device may determine whether the PTU supports the above-described hold command, using an NFC tag.

In an embodiment, the PTU may include a power generating circuit that generates power to be transmitted to the PRU physically coupled with the electronic device. The PTU may include a coil electrically connected to the power generating circuit and transmitting the generated power to the PRU. When the PTU receives a first message from the PRU through the coil, the PTU may control the transmission of the power in response to the reception of the first message.

Figure 7:
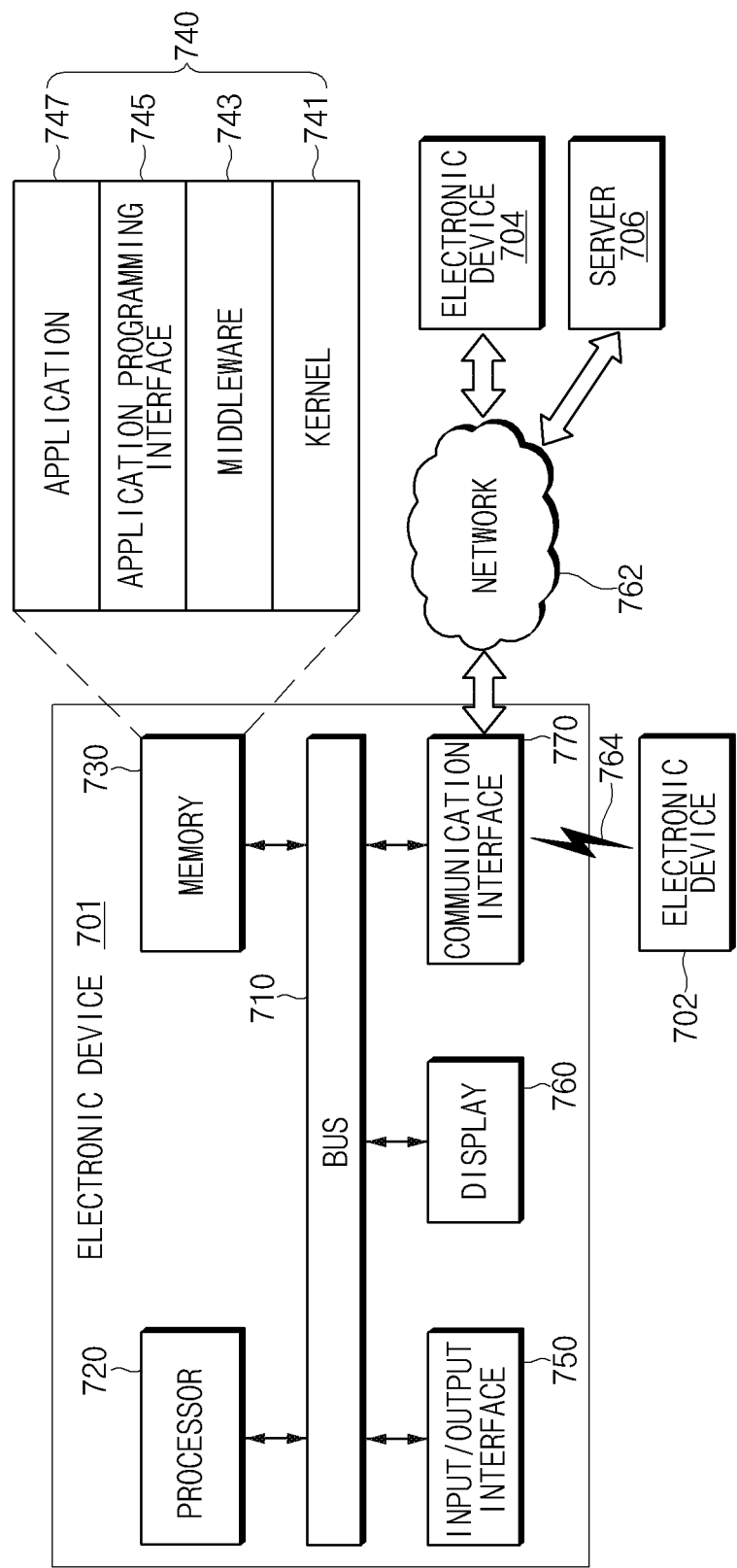
FIG. 7 illustrates an electronic device in a network environment, according to various embodiments.

FIG. 7 illustrates an electronic device in a network environment system, according to various embodiments.

Referring to FIG. 7, according to various embodiments, an electronic device 701, a first electronic device 702, a second electronic device 704, or a server 706 may be connected each other over a network 762 or a short range communication 764. The electronic device 701 may include a bus 710, a processor 720, a memory 730, an input/output interface 750, a display 760, and a communication interface 770. According to an embodiment, the electronic device 701 may not include at least one of the above-described components or may further include other component(s).

For example, the bus 710 may interconnect the above-described components 710 to 770 and may include a circuit for conveying communications (e.g., a control message and/or data) among the above-described components.

The processor 720 may include one or more of a central processing unit (CPU), an application processor (AP), or a communication processor (CP). For example, the processor 720 may perform an arithmetic operation or data processing associated with control and/or communication of at least other components of the electronic device 701.

The memory 730 may include a volatile and/or nonvolatile memory. For example, the memory 730 may store commands or data associated with at least one other component(s) of the electronic device 701. According to an embodiment, the memory 730 may store software and/or a program 740. The program 740 may include, for example, a kernel 741, a middleware 743, an application programming interface (API) 745, and/or an application program (or "an application") 747. At least a part of the kernel 741, the middleware 743, or the API 745 may be referred to as an "operating system (OS)".

For example, the kernel 741 may control or manage system resources (e.g., the bus 710, the processor 720, the memory 730, and the like) that are used to execute operations or functions of other programs (e.g., the middleware 743, the API 745, and the application program 747). Furthermore, the kernel 741 may provide an interface that allows the middleware 743, the API 745, or the application program 747 to access discrete components of the electronic device 701 so as to control or manage system resources.

The middleware 743 may perform, for example, a mediation role such that the API 745 or the application program 747 communicates with the kernel 741 to exchange data.

Furthermore, the middleware 743 may process task requests received from the application program 747 according to a priority. For example, the middleware 743 may assign the priority, which makes it possible to use a system resource (e.g., the bus 710, the processor 720, the memory 730, or the like) of the electronic device 701, to at least one of the application program 747. For example, the middleware 743 may process the one or more task requests according to the priority assigned to the at least one, which makes it possible to perform scheduling or load balancing on the one or more task requests.

The API 745 may be, for example, an interface through which the application program 747 controls a function provided by the kernel 741 or the middleware 743, and may include, for example, at least one interface or function (e.g., an instruction) for a file control, a window control, image processing, a character control, or the like.

The input/output interface 750 may play a role, for example, of an interface which transmits a command or data input from a user or another external device, to other component(s) of the electronic device 701. Furthermore, the input/output interface 750 may output a command or data, received from other component(s) of the electronic device 701, to a user or another external device.

The display 760 may include, for example, a liquid crystal display (LCD), a light-emitting diode (LED) display, an organic LED (OLED) display, a microelectromechanical systems (MEMS) display, or an electronic paper display. The display 760 may display, for example, various contents (e.g., a text, an image, a video, an icon, a symbol, and the like) to a user. The display 760 may include a touch screen and may receive, for example, a touch, gesture, proximity, or hovering input using an electronic pen or a part of a user's body.

For example, the communication interface 770 may establish communication between the electronic device 701 and an external device (e.g., the first electronic device 702, the second electronic device 704, or the server 706). For example, the communication interface 770 may be connected to the network 762 over wireless communication or wired communication to communicate with the external device (e.g., the second electronic device 704 or the server 706).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 764. The short range communication 764 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 701 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 762 may include at least one of telecommunications networks, for example, a computer network (e.g., LAN or WAN), an Internet, or a telephone network.

Each of the first and second electronic devices 702 and 704 may be a device of which the type is different from or the same as that of the electronic device 701. According to an embodiment, the server 706 may include a group of one or more servers. According to various embodiments, all or a portion of operations that the electronic device 701 will perform may be executed by another or plural electronic devices (e.g., the first electronic device 702, the second electronic device 704 or the server 706). According to an embodiment, in the case where the electronic device 701 executes any function or service automatically or in response to a request, the electronic device 701 may not perform the function or the service internally, but, alternatively additionally, it may request at least a portion of a function associated with the electronic device 701 from another device (e.g., the electronic device 702 or 704 or the server 706). The other electronic device may execute the requested function or additional function and may transmit the execution result to the electronic device 701. The electronic device 701 may provide the requested function or service using the received result or may additionally process the received result to provide the requested function or service. To this end, for example, cloud computing, distributed computing, or client-server computing may be used.

Figure 8:
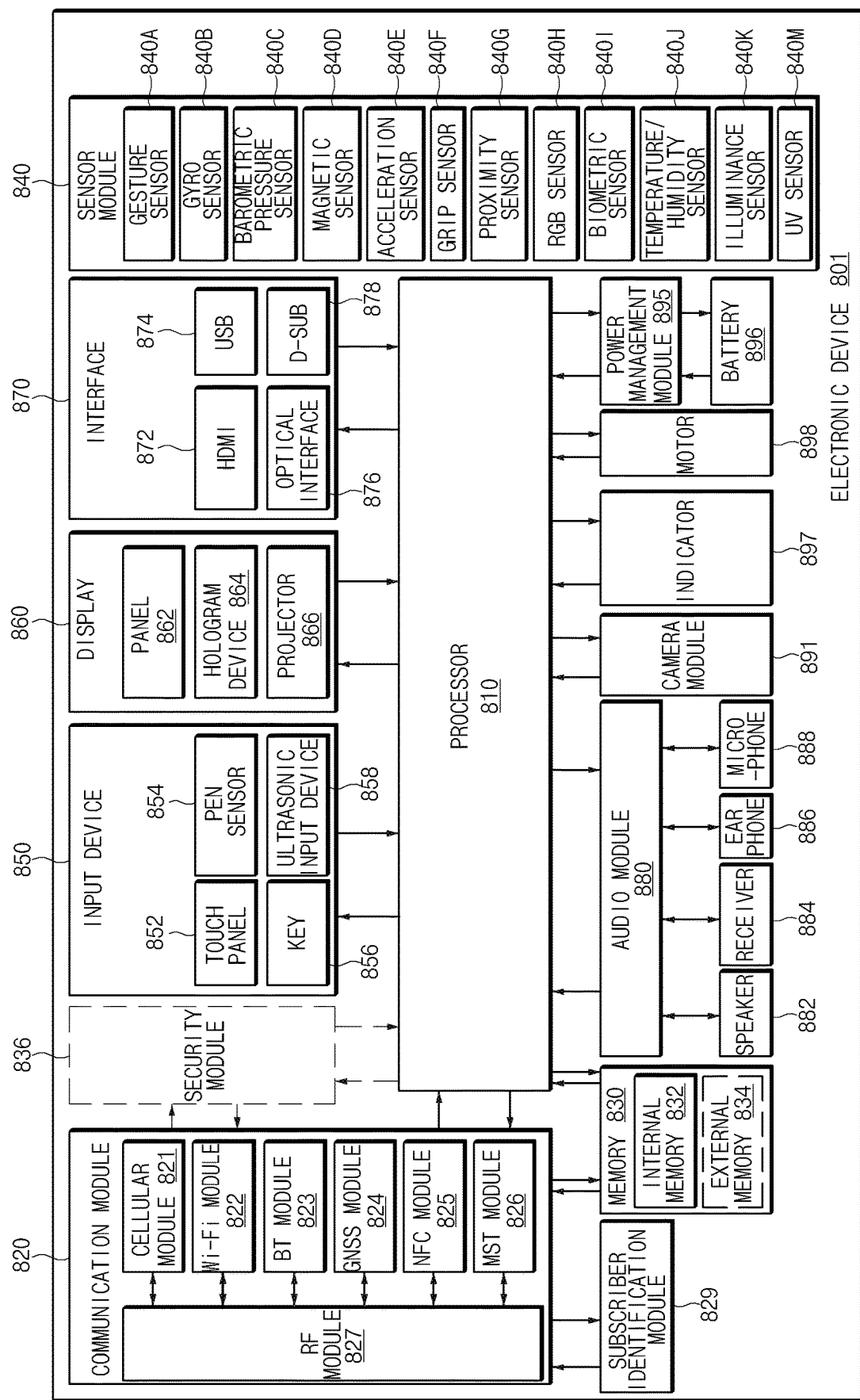
FIG. 8 is a block diagram illustrating an electronic device, according to various embodiments.

FIG. 8 illustrates a block diagram of an electronic device, according to various embodiments.

Referring to FIG. 8, an electronic device 801 may include, for example, all or a part of the electronic device 701 illustrated in FIG. 7. The electronic device 801 may include one or more processors (e.g., an application processor (AP)) 810, a communication module 820, a subscriber identification module 824, a memory 830, a sensor module 840, an input device 850, a display 860, an interface 870, an audio module 880, a camera module 891, a power management module 895, a battery 896, an indicator 897, and a motor 898.

The processor 810 may drive, for example, an operating system (OS) or an application to control a plurality of hardware or software components connected to the processor 810 and may process and compute a variety of data. For example, the processor 810 may be implemented with a System on Chip (SoC). According to an embodiment, the processor 810 may further include a graphic processing unit (GPU) and/or an image signal processor. The processor 810 may include at least a part (e.g., a cellular module 821) of components illustrated in FIG. 8. The processor 810 may load a command or data, which is received from at least one of other components (e.g., a nonvolatile memory), into a volatile memory and process the loaded command or data. The processor 810 may store a variety of data in the nonvolatile memory.

The communication module 820 may be configured the same as or similar to the communication interface 770 of FIG. 7. The communication module 820 may include the cellular module 821, a Wi-Fi module 822, a Bluetooth (BT) module 823, a GNSS module 824 (e.g., a GPS module, a Glonass module, a Beidou module, or a Galileo module), a near field communication (NFC) module 825, a MST module 826 and a radio frequency (RF) module 827.

The cellular module 821 may provide, for example, voice communication, video communication, a character service, an Internet service, or the like over a communication network. According to an embodiment, the cellular module 821 may perform discrimination and authentication of the electronic device 801 within a communication network by using the subscriber identification module (e.g., a SIM card) 829. According to an embodiment, the cellular module 821 may perform at least a portion of functions that the processor 810 provides. According to an embodiment, the cellular module 821 may include a communication processor (CP).

Each of the Wi-Fi module 822, the BT module 823, the GNSS module 824, the NFC module 825, or the MST module 826 may include a processor for processing data exchanged through a corresponding module, for example. According to an embodiment, at least a part (e.g., two or more) of the cellular module 821, the Wi-Fi module 822, the BT module 823, the GNSS module 824, the NFC module 825, or the MST module 826 may be included within one Integrated Circuit (IC) or an IC package.

For example, the RF module 827 may transmit and receive a communication signal (e.g., an RF signal). For example, the RF module 827 may include a transceiver, a power amplifier module (PAM), a frequency filter, a low noise amplifier (LNA), an antenna, or the like. According to another embodiment, at least one of the cellular module 821, the Wi-Fi module 822, the BT module 823, the GNSS module 824, the NFC module 825, or the MST module 826 may transmit and receive an RF signal through a separate RF module.

The subscriber identification module 829 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 830 (e.g., the memory 730) may include an internal memory 832 or an external memory 834. For example, the internal memory 832 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 834 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 834 may be operatively and/or physically connected to the electronic device 801 through various interfaces.

A security module 836 may be a module that includes a storage space of which a security level is higher than that of the memory 830 and may be a circuit that guarantees safe data storage and a protected execution environment. The security module 836 may be implemented with a separate circuit and may include a separate processor. For example, the security module 836 may be in a smart chip or a secure digital (SD) card, which is removable, or may include an embedded secure element (eSE) embedded in a fixed chip of the electronic device 801. Furthermore, the security module 836 may operate based on an operating system (OS) that is different from the OS of the electronic device 801. For example, the security module 836 may operate based on Java card open platform (JCOP) OS.

The sensor module 840 may measure, for example, a physical quantity or may detect an operation state of the electronic device 801. The sensor module 840 may convert the measured or detected information to an electric signal. For example, the sensor module 840 may include at least one of a gesture sensor 840A, a gyro sensor 840B, a barometric pressure sensor 840C, a magnetic sensor 840D, an acceleration sensor 840E, a grip sensor 840F, the proximity sensor 840G, a color sensor 840H (e.g., red, green, blue (RGB) sensor), a biometric sensor 840I, a temperature/humidity sensor 840J, an illuminance sensor 840K, or an UV sensor 840M. Although not illustrated, additionally or alternatively, the sensor module 840 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit for controlling at least one or more sensors included therein. According to an embodiment, the electronic device 801 may further include a processor that is a part of the processor 810 or independent of the processor 810 and is configured to control the sensor module 840. The processor may control the sensor module 840 while the processor 810 remains at a sleep state.

The input device 850 may include, for example, a touch panel 852, a (digital) pen sensor 854, a key 856, or an ultrasonic input unit 858. For example, the touch panel 852 may use at least one of capacitive, resistive, infrared and ultrasonic detecting methods. Also, the touch panel 852 may further include a control circuit. The touch panel 852 may further include a tactile layer to provide a tactile reaction to a user.

The (digital) pen sensor 854 may be, for example, a part of a touch panel or may include an additional sheet for recognition. The key 856 may include, for example, a physical button, an optical key, a keypad, or the like. The ultrasonic input device 858 may detect (or sense) an ultrasonic signal, which is generated from an input device, through a microphone (e.g., a microphone 888) and may check data corresponding to the detected ultrasonic signal.

The display 860 (e.g., the display 760) may include a panel 862, a hologram device 864, or a projector 866. The panel 862 may be the same as or similar to the display 760 illustrated in FIG. 1. The panel 862 may be implemented, for example, to be flexible, transparent or wearable. The panel 862 and the touch panel 852 may be integrated into a single module. The hologram device 864 may display a stereoscopic image in a space using a light interference phenomenon. The projector 866 may project light onto a screen so as to display an image. For example, the screen may be arranged in the inside or the outside of the electronic device 801. According to an embodiment, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-subminiature (D-sub) 878. The interface 870 may be included, for example, in the communication interface 770 illustrated in FIG. 7. Additionally or alternatively, the interface 870 may include, for example, a mobile high definition link (MHL) interface, a SD card/multi-media card (MMC) interface, or an infrared data association (IrDA) standard interface.

The audio module 880 may convert a sound and an electric signal in dual directions. At least a component of the audio module 880 may be included, for example, in the input/output interface 750 illustrated in FIG. 1. The audio module 880 may process, for example, sound information that is input or output through a speaker 882, a receiver 884, an earphone 886, or the microphone 888.

For example, the camera module 891 may shoot a still image or a video. According to an embodiment, the camera module 891 may include at least one or more image sensors (e.g., a front sensor or a rear sensor), a lens, an image signal processor (ISP), or a flash (e.g., an LED or a xenon lamp).

The power management module 895 may manage, for example, power of the electronic device 801. According to an embodiment, a power management integrated circuit (PMIC), a charger IC, or a battery or fuel gauge may be included in the power management module 895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 801 or a part thereof (e.g., the processor 810), such as a booting state, a message state, a charging state, and the like. The motor 898 may convert an electrical signal into a mechanical vibration and may generate the following effects: vibration, haptic, and the like. Although not illustrated, a processing device (e.g., a GPU) for supporting a mobile TV may be included in the electronic device 801. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 9:
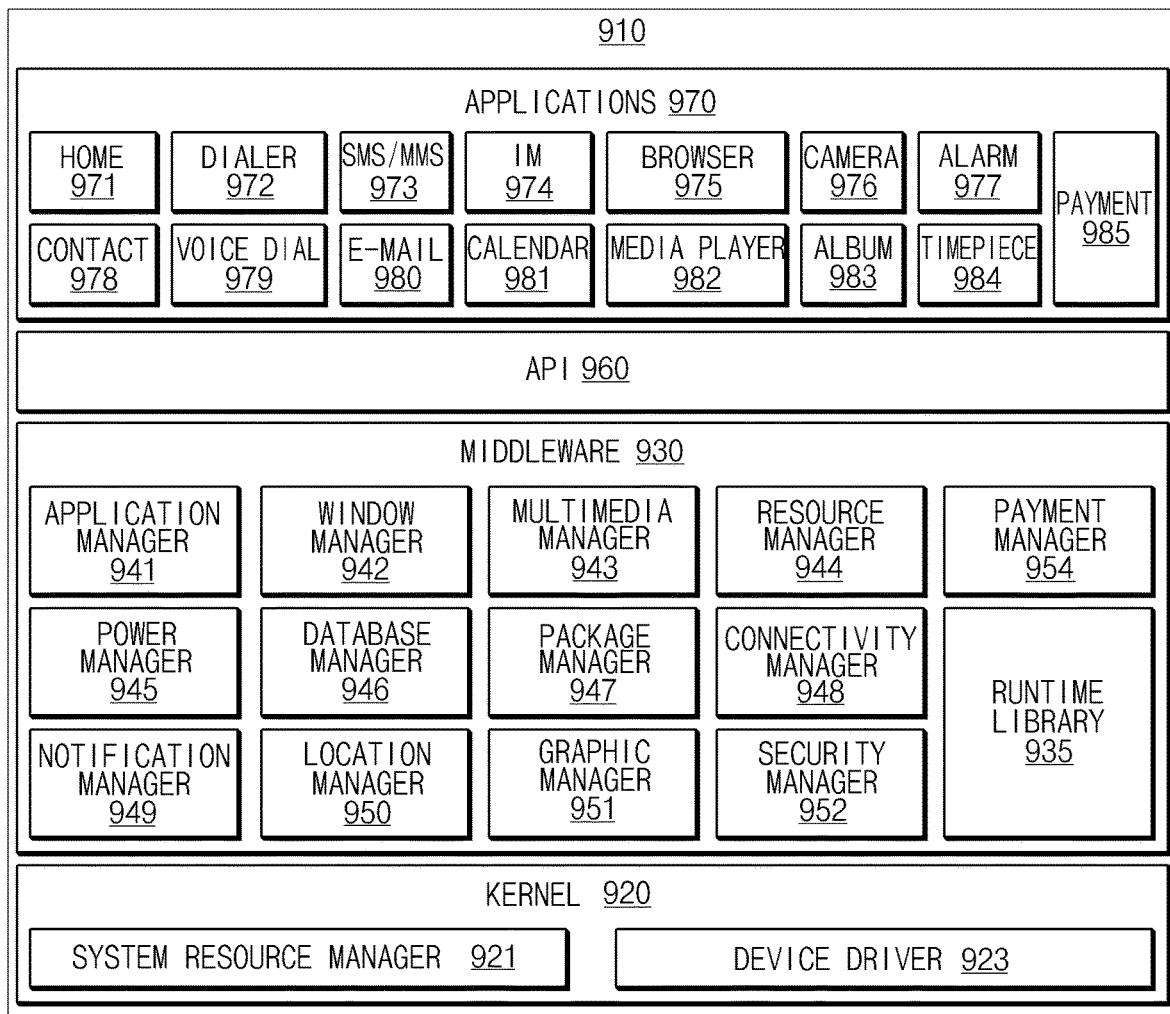
FIG. 9 is a block diagram of a program module, according to various embodiments.

FIG. 9 illustrates a block diagram of a program module, according to various embodiments.

According to an embodiment, a program module 910 (e.g., the program 740) may include an operating system (OS) to control resources associated with an electronic device (e.g., the electronic device 701), and/or diverse applications (e.g., the application program 747) driven on the OS. The OS may be, for example, Android™, iOS™, Windows™, Symbian™, or Tizen™.

The program module 910 may include a kernel 920, a middleware 930, an application programming interface (API) 960, and/or an application 970. At least a portion of the program module 910 may be preloaded on an electronic device or may be downloadable from an external electronic device (e.g., the first electronic device 702, the second electronic device 704, the server 706, or the like).

The kernel 920 (e.g., the kernel 741) may include, for example, a system resource manager 921 or a device driver 923. The system resource manager 921 may perform control, allocation, or retrieval of system resources. According to an embodiment, the system resource manager 921 may include a process managing unit, a memory managing unit, or a file system managing unit. The device driver 923 may include, for example, a display driver, a camera driver, a Bluetooth driver, a shared memory driver, a USB driver, a keypad driver, a Wi-Fi driver, an audio driver, or an inter-process communication (IPC) driver.

The middleware 930 may provide, for example, a function that the application 970 needs in common, or may provide diverse functions to the application 970 through the API 960 to allow the application 970 to efficiently use limited system resources of the electronic device. According to an embodiment, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, or a payment manager 954.

The runtime library 935 may include, for example, a library module that is used by a compiler to add a new function through a programming language while the application 970 is being executed. The runtime library 935 may perform input/output management, memory management, or capacities about arithmetic functions.

The application manager 941 may manage, for example, a life cycle of at least one application of the application 970. The window manager 942 may manage a graphic user interface (GUI) resource that is used in a screen. The multimedia manager 943 may identify a format necessary for playing diverse media files, and may perform encoding or decoding of media files by using a codec suitable for the format. The resource manager 944 may manage resources such as a storage space, memory, or source code of at least one application of the application 970.

The power manager 945 may operate, for example, with a basic input/output system (BIOS) to manage a battery or power, and may provide power information for an operation of an electronic device. The database manager 946 may generate, search for, or modify database that is to be used in at least one application of the application 970. The package manager 947 may install or update an application that is distributed in the form of package file.

The connectivity manager 948 may manage, for example, wireless connection such as Wi-Fi or Bluetooth. The notification manager 949 may display or notify an event such as arrival message, appointment, or proximity notification in a mode that does not disturb a user. The location manager 950 may manage location information about an electronic device. The graphic manager 951 may manage a graphic effect that is provided to a user, or manage a user interface relevant thereto. The security manager 952 may provide a general security function necessary for system security, user authentication, or the like. According to an embodiment, in the case where an electronic device (e.g., the electronic device 701) includes a telephony function, the middleware 930 may further include a telephony manager for managing a voice or video call function of the electronic device.

The middleware 930 may include a middleware module that combines diverse functions of the above-described components. The middleware 930 may provide a module specialized to each OS kind to provide differentiated functions. Additionally, the middleware 930 may dynamically remove a part of the preexisting components or may add new components thereto.

The API 960 (e.g., the API 745) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 970 (e.g., the application program 747) may include, for example, one or more applications capable of providing functions for a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, or a timepiece 984, or for offering health care (e.g., measuring an exercise quantity, blood sugar, or the like) or environment information (e.g., information of barometric pressure, humidity, temperature, or the like).

According to an embodiment, the application 970 may include an application (hereinafter referred to as "information exchanging application" for descriptive convenience) to support information exchange between an electronic device (e.g., the electronic device 701) and an external electronic device (e.g., the first electronic device 702 or the second electronic device 704). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 970 may include an application (e.g., a health care application of a mobile medical device) that is assigned in accordance with an attribute of an external electronic device. According to an embodiment, the application 970 may include an application that is received from an external electronic device (e.g., the first electronic device 702, the second electronic device 704, or the server 706). According to an embodiment, the application 970 may include a preloaded application or a third party application that is downloadable from a server. The names of components of the program module 910 according to the embodiment may be modifiable depending on kinds of operating systems.

According to various embodiments, at least a portion of the program module 910 may be implemented by software, firmware, hardware, or a combination of two or more thereof. At least a portion of the program module 910 may be implemented (e.g., executed), for example, by the processor (e.g., the processor 810). At least a portion of the program module 910 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 720), may cause the one or more processors to perform a function corresponding to the instruction. The computer-readable storage media, for example, may be the memory 730.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
  a housing;
  a battery;
  a first coil receiving power transmitted wirelessly from a power transmitting unit physically coupled with the electronic device through the housing;
  a wireless charging circuit electrically connected to the first coil and configured to transmit the received power to the battery;
  a communication circuit configured to generate a payment signal, using a second coil distinguished from the first coil; and
  a processor electrically connected to the wireless charging circuit and the communication circuit;
  wherein the processor is configured to:
  identify an event associated with the payment signal; and
  transmit a first message, which is set such that the power transmitting unit adjusts transmission of power, to the power transmitting unit through the first coil based on the event.

2. The electronic device of claim 1, wherein the payment signal is set to be generated based on one scheme of a magnetic secure transmission (MST) scheme and a near field communication (NFC) scheme.

3. The electronic device of claim 1, wherein the processor is configured to:
  when an application associated with the payment signal is executed, transmit the first message to the power transmitting unit.

4. The electronic device of claim 1, wherein the processor is configured to:
  when authentication of a user associated with the payment signal occurs, transmit the first message to the power transmitting unit.

5. The electronic device of claim 1, wherein the first message is set such that the power transmitting unit interrupts transmission of power.

6. The electronic device of claim 1, wherein the first message is transmitted to the power transmitting unit such that the transmission of the power is interrupted during a predetermined time, and
  wherein the processor is configured to:
  when the predetermined time has elapsed, receive power from the power transmitting unit through the first coil.

7. The electronic device of claim 6, wherein the predetermined time is differently designated depending on a payment method in which the payment signal is generated or a type of the electronic device.

8. The electronic device of claim 1, wherein the processor is configured to:
  perform authentication on the power transmitting unit; and
  control the communication circuit depending on whether the authentication is successful.

9. The electronic device of claim 8, wherein the processor is configured to:
  when the authentication fails, while power is received from the power transmitting unit, restrict the communication circuit from generating the payment signal.

10. The electronic device of claim 8, further comprising:
  a display,
  wherein the processor is configured to:
  when the authentication fails, display a screen for providing a notification that a payment is impossible, on the display in response to occurrence of the event.

11. The electronic device of claim 8, wherein the processor is configured to:
  when the authentication is successful, while power is received from the power transmitting unit, allow the communication circuit to generate the payment signal.

12. The electronic device of claim 1, wherein the communication circuit is configured to:
  when reception of the power is temporarily interrupted in the wireless charging circuit, generate the payment signal.

13. The electronic device of claim 12, wherein the processor is configured to:
  when execution of a payment corresponding to the payment signal is not completed or when a retry request for the payment is present, transmit the first message to the power transmitting unit through the first coil again.

14. The electronic device of claim 12, wherein the processor is configured to:
  when execution of a payment corresponding to the payment signal is terminated, transmit a second message set such that the power transmitting unit restarts supply of the power, to the power transmitting unit through the first coil.

15. A method performed by an electronic device, the method comprising:
  wirelessly receiving power from a power transmitting unit physically coupled with the electronic device through a first coil;
  while wirelessly receiving the power, identifying an event associated with a payment signal;

transmitting a first message, which is set such that the power transmitting unit adjusts transmission of power, to the power transmitting unit through the first coil based on the event; and when the power transmission is interrupted from the power transmitting unit, generating the payment signal through a second coil.

\* \* \* \* \*